April 11, 1967

L. G. SIMJIAN 3,313,230

COOKING APPLIANCE

Filed Jan. 15, 1965

Luther G. Simjian
INVENTOR.

BY *Ervin B. Steinberg*

AGENT.

United States Patent Office 3,313,230
Patented Apr. 11, 1967

3,313,230
COOKING APPLIANCE
Luther G. Simjian, Laurel Lane,
Greenwich, Conn. 06830
Filed Jan. 15, 1965, Ser. No. 425,898
11 Claims. (Cl. 99—375)

This invention refers to a novel cooking appliance and, more specifically, has reference to an improved cooking appliance which is provided with means for improving the contact and heat transfer between an article to be cooked and the heated surface with which the article is in contact.

This invention, moreover, is related to my copending application for U.S. Letters Patent Ser. No. 411,037, filed Nov. 13, 1964, entitled, "Cooking Appliance," in which I disclose a cooking pot, a pan, and a removable insert, each such appliance being provided with a flexible diaphragm which serves as the cooking surface. The diaphragm, as disclosed in the aforesaid application, is sufficiently flexible and pliable to conform, at least in part, to the contour of the article supported thereupon. Additionally, the diaphragm is provided with a surface having relatively high release properties in order to obviate the need for lubricants which prevent the burning of the article to the cooking appliance at the area of intimate contact.

The instant disclosure is concerned with an appliance which encloses the article to be cooked between two opposing diaphragm surfaces, one or preferably both of these diaphragms being heated so that the article can be cooked simultaneously from two sides, thus taking advantage of the desirable characteristics described in the heretofore identified patent application. To this end, the cooking appliance, in its basic construction, comprises a pair of opposed diaphragms adapted to confine therebetween an article which is to be cooked, means for heating at least one of the diaphragms, and the diaphragms being sufficiently flexible to conform to the contour of the article to provide intimate contact therewith and having, additionally, a surface characterized by relatively high release properties at the area of contact with the article. A further feature of the cooking appliance comprises the use of a flexible filler medium, such as granular material, to support the diaphragm surface and act as a heat conducting material.

One of the principal objects of this invention is, therefore, the provision of an improved cooking appliance.

Another object of this invention is the provision of a cooking appliance equipped with two opposing flexible diaphragms which are designed to confine therebetween an article to be cooked.

A further object of this invention is the provision of a novel cooking appliance having two opposing diaphragms for confining therebetween an article to be cooked, the diaphragms serving as heated cooking surfaces and being provided with a surface having relatively high release properties, whereby to prevent the burning and sticking of food.

Other and further objects of this invention will be more clearly apparent by reference to the following descripiton when taken in conjunction with the accompanying drawings in which.

Figure 1:
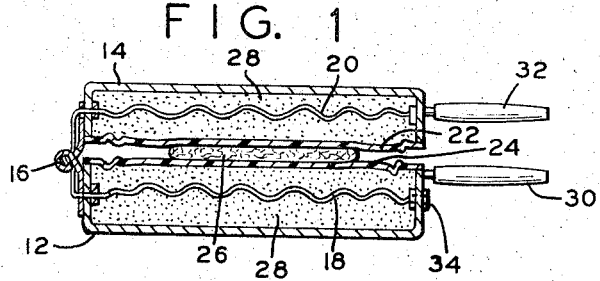
FIGURE 1 is a vertical section depicting a typical embodiment of the present invention.

Referring now to the figures and FIGURE 1 in particular, numerals 22 and 24 identify a pair of opposed flexible diaphragms confining therebetween an article 26 to be cooked, such as a piece of meat. The diaphragms are flexible and designed to be capable to substantially conform to the contour of the article confined therebetween. To this end, the diaphragms are convexly bowed toward the center, or provided with an annular convolution as is shown in the figure and also in the patent application referenced above. Each of the diaphragms is mounted at its periphery to one of the respective cup shaped frames 12, 14 which are held together by a hinge 16 to provide for the opening and closing of the space between the diaphragms, which space is normally occupied by the article to be cooked as shown.

The space between the respective frames and the associated diaphragms is filled with a flexible, readily distortable filler medium 28, such as granular material, e.g. silica, sand, etc. The filler medium shifts under the flexing of the diaphragm and supports the diaphragm at the area extending inwardly from the periphery. Each of the diaphragms is heated by an electrical heating element 18, 20 which terminate at an electrical connector 34. Additionally, handles 30 and 32 are provided to enable convenient manipulating of the frames for insertion and removal of the article 26.

In order to provide a non-adhesive cooking surface, the diaphragm surface normally in contact with the article 26 is coated with material having relatively high release properties, such as fluorocarbon thermoplastic material, for instance the commercially known product Teflon, or alternatively the diaphragms may be made partially or entirely of such sheet material. In this manner, no lubricants are required to forestall the adhesion or burning of the article to the cooking surface, yet, due to the flexibility of the diaphragm material, each such diaphragm is capable to conform at least partially to the contour of the article so as to achieve excellent heat transfer between the cooking surface and the article. This unique combination results in a more uniformly cooked article characterized by improved flavor and appearance.

Figure 2:
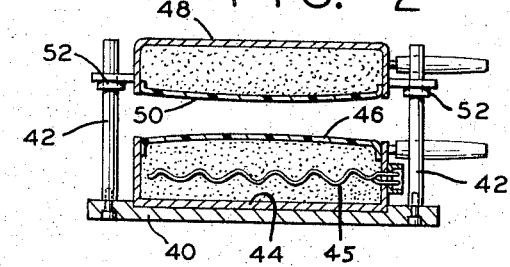
FIGURE 2 is a vertical section of an alternative embodiment.

FIGURE 2 indicates a similarly constructed cooking appliance. A lower frame 44 resting on a base plate 40 is provided with a diaphragm 46. This lower frame is opposed by an upper frame 48 which is provided with a diaphragm 50. The base plate 40 is fitted with a set of upstanding rods 42 which cooperate with apertured ears 52 attached to the upper frame 48. The upper frame, therefore, is urged to slide under the influence of gravity toward the lower frame, thereby automatically enclosing therebetween an article to be cooked which is placed upon the diaphragm 46. In this example only the lower frame 44 is fitted with an electric heater 45.

Figure 3:
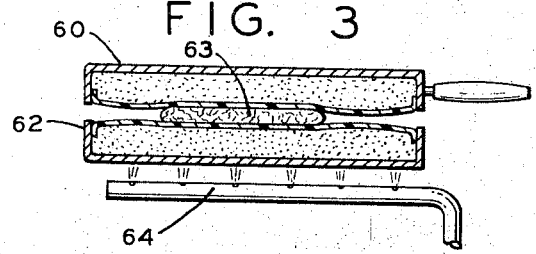
FIGURE 3 is a vertical section of another alternative embodiment.

In FIGURE 3 a substantially similar construction of the cooking appliance is shown, depicting an upper portion 60 which rests on the article 63 to be cooked, and both being supported on the lower portion 62. A gas flame burner 64 is used to impart heat upon the lower frame 62, the heat being transferred by the flexible filler medium to the diaphragm attached to this lower frame.

Figure 4:
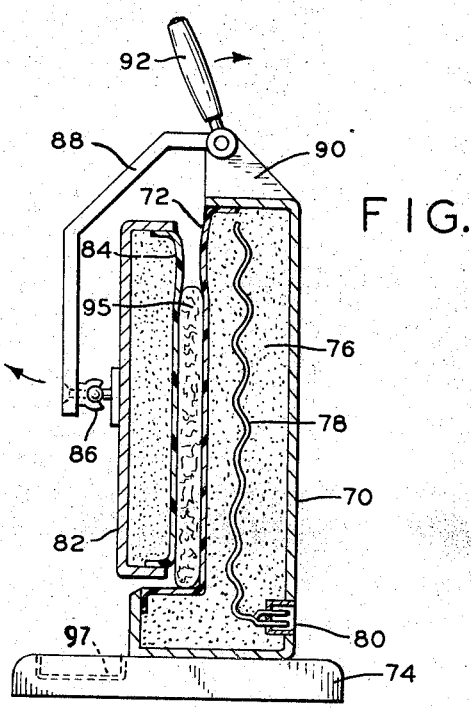
FIGURE 4 is a vertical section of still another embodiment of the present invention.

A further alternative construction is shown in FIGURE 4 in which the article of food is cooked in a position which causes liquids, such as fat, to drop off from the article to be cooked. An L-shaped frame 70, equipped with a diaphragm 72, is standing in an upright position on a base 74. The space between the frame and the diaphragm is occupied by a flexible filler medium 76 and an electric heating element 78, the latter terminating in a connector 80 near the base 74.

A movable frame 82 having a diaphragm 84 is supported by means of a ball and socket joint 86 and a linkage 88 at a bracket 90 which is attached to the frame 70. A rotatable handle 92 coacts with a cam (not shown)

to urge upon rotation thereof the movable frame 82 toward the stationary frame 70 so as to clamp the article 95 between the diaphragms 72 and 84. A ratchet and pawl (not shown) may be used in conjunction with the handle 92 to retain the article 95 under the desired pressure.

Although no heater is shown in frame 82, it will be apparent that one may be provided therein as is shown in FIGURE 1. Alternatively, the diaphragm 84 may be backed up by a layer of insulating material, such as glass fibers and a reflecting layer of aluminum, in order to reflect the heat received from the diaphragm 72 and article of food 95 back into this article, thus avoiding heat losses in the frame 82 and, hence, increasing the efficiency of the foregoing cooking appliance. Obviously, this same technique may be incorporated in the constructions illustrated in FIGURES 2 and 3. The base 74 may be provided with a well 97 to collect liquids running off from the article 95.

It will be apparent that the filler medium shown as granular material in the figures may be a liquid as has been described and illustrated in the patent application referenced.

A further modification concerns the heating means. The electrical heating element, for instance numeral 18 of FIGURE 1, is shown as a flexible or rigid strip heater. It will be apparent that this element may be arranged in the form of a planar spiral. Additionally, the element may be attached directly to the underside of the diaphragm for motion therewith as caused by the contour of the article.

While there have been described and illustrated several preferred embodiments of my invention, it will be apparent to those skilled in the art that various further changes and modifications may be made therein without deviating from the broad principle and intent of this invention, which shall be limited only by the scope of the appended claims.

What is claimed is:

1. A cooking appliance comprising in combination:
a pair of opposed diaphragms adapted to be in contact with respective opposite sides of an article to be cooked;
each diaphragm being sufficiently flexible to conform at least in part to the contour of the article and each diaphragm being provided with a surface having relatively high release properties at the area of contact with the article;
a frame for holding each respective diaphragm along its periphery;
a flexible filler medium adapted to yield under pressure disposed between said frame and the underside of said diaphragms for supporting each respective diaphragm along its surface inward from the periphery, and
heating means for heating the filler medium and at least one of said diaphragms whereby to provide a cooking surface for the article.

2. A cooking appliance as set forth in claim 1 wherein heating means are disposed to heat each of said diaphragms.

3. A cooking appliance as set forth in claim 1 wherein said filler medium is granular material.

4. A cooking appliance as set forth in claim 1 wherein said diaphragms are made of Teflon material.

5. A cooking appliance as set forth in claim 1 wherein force means are provided to urge said diaphragms toward one another.

6. A cooking appliance comprising in combination:
a base plate;
a first frame upstanding from said base plate;
said first frame having a flexible diaphragm which is adapted to receive an article to be cooked and said diaphragm being disposed in a plane to intersect a horizontal plane through said base plate;
a second frame mounted for motion relative to said first frame;
said second frame having a flexible diaphragm adapted to oppose said first diaphragm whereby the space therebetween is useful for retaining therein an article to be cooked;
means for moving said second frame relative to said first time frame for adjusting the space between said diaphragms;
means for heating at least one of said diaphragms, and
said diaphragms exhibiting a surface having relatively high release properties at the area normally in contact with an article to be cooked.

7. A cooking appliance as set forth in claim 6 wherein said diaphragms are disposed generally in a vertical plane.

8. A cooking appliance as set forth in claim 6 wherein said diaphragms are disposed in a plane to cause liquid from an article to be cooked to run off toward said base.

9. A cooking appliance as set forth in claim 6 and including pivoting means for providing motion of said second frame relative to said first frame.

10. A cooking appliance having in combination:
two opposed flexible diaphragms adapted to confine therebetween an article to be cooked, and
means comprising a flexible medium supporting each of said diaphragms to enable them to conform at least in part to the contour of an article confined therebetween.

11. A cooking appliance as set forth in claim 10 wherein said flexible medium is a liquid.

References Cited by the Examiner

UNITED STATES PATENTS

| | | | |
|---|---|---|---|
| 963,892 | 7/1910 | Haskins | 219—540 |
| 2,070,850 | 2/1937 | Trabold | 99—109 |
| 2,174,425 | 9/1939 | Schlumbohm | 126—390 X |
| 2,618,728 | 11/1952 | Bram | 219—243 |
| 2,765,728 | 10/1956 | Pearce | 126—390 X |
| 3,008,601 | 11/1961 | Cahne | 126—390 X |
| 3,038,058 | 6/1962 | Gordon | 126—400 X |
| 3,083,286 | 3/1963 | Swetlitz | 219—462 X |

FREDERICK L. MATTESON, Jr., *Primary Examiner.*

ROBERT A. DUA, *Examiner.*